US012345220B1

(12) United States Patent
Kumar et al.

(10) Patent No.: US 12,345,220 B1
(45) Date of Patent: Jul. 1, 2025

(54) AIR-HANDLING SYSTEM FOR FUEL-EFFICIENT LOW LOAD THERMAL PROMOTION AND HIGH LOAD OPERATION FOR HEAVY DUTY ENGINES

(71) Applicant: ARAMCO SERVICES COMPANY, Houston, TX (US)

(72) Inventors: Praveen Kumar, New Hudson, MI (US); Yu Zhang, Novi, MI (US); David Cleary, West Bloomfield, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/400,474

(22) Filed: Dec. 29, 2023

(51) Int. Cl.
*F02M 26/01* (2016.01)
*F02B 37/00* (2006.01)
(Continued)

(52) U.S. Cl.
CPC ............. *F02M 26/04* (2016.02); *F02B 37/00* (2013.01); *F02B 37/12* (2013.01); *F02B 37/22* (2013.01);
(Continued)

(58) Field of Classification Search
CPC ........ F02M 26/01; F02M 26/04; F02M 26/05; F02M 2026/004; F02B 37/00; F02B 37/12; F02B 37/22; F01N 2260/14
See application file for complete search history.

(56) References Cited

U.S. PATENT DOCUMENTS 3,232,043 A * 2/1966 Birmann ............. F04D 27/0246 417/406
4,445,488 A 5/1984 Tanaka et al.
(Continued)

FOREIGN PATENT DOCUMENTS

CN 113530665 A 10/2021
EP 2588727 B1 12/2018
(Continued)

OTHER PUBLICATIONS

Zhang Y. et al.1 "An Experimental and Computational Investigation of Tailor-Developed Combustion and Air-Handling System Concepts in a Heavy-Duty Gasoline Compression Ignition Engine," Energies, 2022 (23 pages).
(Continued)

*Primary Examiner* — Audrey B. Walter
(74) *Attorney, Agent, or Firm* — Osha Bergman, Watanabe Burton LLP

(57) ABSTRACT

Described is an engine with a camshaft having a single cam profile, a gas intake manifold, and an exhaust gas rebreather system for receiving an exhaust gas from the engine. The exhaust gas rebreather system includes a main exhaust gas outlet configured to receive the exhaust gas. An exhaust gas rebreather line of the exhaust gas rebreather system returns a portion of the exhaust gas in the main exhaust gas outlet to the gas intake manifold. A variable nozzle turbocharger having one or more variable nozzle vanes is in fluid connection with the main exhaust gas outlet. The exhaust rebreather system further includes an exhaust gas recirculation valve and a back pressure valve. The exhaust gas recirculation valve is disposed in the exhaust gas rebreather line and in fluid connection with the main exhaust gas outlet, and the back pressure valve downstream of the variable nozzle turbocharger.

19 Claims, 9 Drawing Sheets

(51) Int. Cl.

| | |
|---|---|
| ***F02B 37/12*** | (2006.01) |
| ***F02B 37/22*** | (2006.01) |
| ***F02M 26/04*** | (2016.01) |
| ***F02M 26/05*** | (2016.01) |
| *F02M 26/00* | (2016.01) |

(52) U.S. Cl.

CPC ............ *F02M 26/01* (2016.02); *F02M 26/05* (2016.02); *F01N 2260/14* (2013.01); *F02M 2026/004* (2016.02)

(56) References Cited

U.S. PATENT DOCUMENTS

| | | | | |
|---|---|---|---|---|
| 6,988,365 | B2 | 1/2006 | Sasaki | |
| 8,544,266 | B2 | 10/2013 | Bruck et al. | |
| 9,038,376 | B2 | 5/2015 | Petrovic et al. | |
| 9,670,841 | B2 | 6/2017 | Mittricker et al. | |
| 9,695,729 | B2 | 7/2017 | Light-Holets | |
| 10,704,436 | B2 | 7/2020 | Jozsa et al. | |
| 11,828,220 | B1 * | 11/2023 | Zhang | F02B 19/12 |
| 2008/0148720 | A1 | 6/2008 | Tahara | |
| 2009/0293453 | A1 | 12/2009 | Sujan | |
| 2010/0300089 | A1 | 12/2010 | Gibble et al. | |
| 2011/0048389 | A1 * | 3/2011 | Hsia | F02M 26/50 123/568.21 |
| 2011/0120123 | A1 | 5/2011 | Dickerson et al. | |
| 2016/0312689 | A1 * | 10/2016 | Kemmerling | F02B 37/22 |
| 2019/0107066 | A1 | 4/2019 | Kurtz et al. | |
| 2019/0178187 | A1 * | 6/2019 | Smith | B01D 53/9418 |
| 2020/0018243 | A1 * | 1/2020 | Baltrucki | F01L 1/181 |
| 2020/0224614 | A1 * | 7/2020 | Hu | F02B 37/10 |
| 2022/0056854 | A1 * | 2/2022 | Robel | F02B 37/24 |
| 2023/0139973 | A1 * | 5/2023 | Kurtz | F02D 41/12 123/568.21 |
| 2023/0384183 | A1 * | 11/2023 | Worms | F02D 41/0007 |

FOREIGN PATENT DOCUMENTS

| | | | | |
|---|---|---|---|---|
| JP | H0953456 | A | | 2/1997 |
| JP | 2009002275 | A | * | 1/2009 |
| KR | 100982225 | B1 | | 9/2010 |
| KR | 101132379 | B1 | | 4/2012 |
| WO | 2014175816 | A1 | | 10/2014 |

OTHER PUBLICATIONS

Kumar, P, et al., "Variable Valve Strategy Evaluation for Low-Load Operation in a Heavy-Duty Gasoline Compression Ignition Engine," Energies, 2017 (25 pages).

Ding, C., et al., "Fuel efficient exhaust thermal management for compression ignition engines during idle via cylinder deactivation and flexible valve actuation," International Journal of Engine Research, 2016, pp. 619-630 (12 pages).

Gosala DB, et al., "Diesel engine aftertreatment warm-up through early exhaust valve opening and internal exhaust gas recirculation during idle operation," International Journal of Engine Research, 2018, pp. 758-773 (16 pages).

Ramesh AK, et al., "Reverse breathing in diesel engines for aftertreatment thermal management," International Journal of Engine Research, 2019, pp. 862-876 (15 pages).

California Air Resources Board (CARB), Heavy-Duty Low-NOx Program, <https://www.arb.ca.gov/msprog/hdlownox/> , Sep. 26, 2019 (10 pages).

Sharp, C., Webb, et al., "Achieving Ultra Low NOX Emissions Levels with a 2017 Heavy-Duty on-Highway TC Diesel Engine and an Advanced Technology Emissions System-Thermal Management Strategies," SAE Int. J. Engines, 2017, pp. 1697-1712 (17 pages).

Ratzberger, R., et al., "Evaluation of Valve Train Variability in Diesel Engines," SAE Int. J. Engines, 2015 (16 pages).

Kovacs, D., et al., "Modeling Heavy-Duty Engine Thermal Management Technologies to Meet Future cold Start Requirements," SAE Technical Paper, 2019 (17 pages).

International Search Report issued for corresponding international patent application No. PCT/US2024/061168, mailed Mar. 27, 2025 (6 pages).

Written Opinion issued for corresponding international patent application No. PCT/US2024/061168, mailed Mar. 27, 2025 (10 pages).

* cited by examiner

AIR-HANDLING SYSTEM FOR FUEL-EFFICIENT LOW LOAD THERMAL PROMOTION AND HIGH LOAD OPERATION FOR HEAVY DUTY ENGINES

BACKGROUND

To meet ultra-low tailpipe Nitrogen Oxides (NOX) limits, both combustion and engine aftertreatment (EAT) strategies have been considered. For example, some proposed EAT strategies have included using an increased exhaust temperature to achieve early selective catalytic reduction (SCR) catalyst light-off. For a typical SCR system, urea dosing in the SCR system begins when the temperature at the SCR inlet (SCR-In Temp) reaches approximately 200° C.

Several methods have been proposed for increasing exhaust temperature, including engine strategies and variable valve strategies. Among these, the exhaust rebreathing strategy has demonstrated the most favorable tradeoff between exhaust temperature increase and brake specific fuel consumption (BSFC). During exhaust rebreathing, hot exhaust gases are re-inducted into the cylinder during a second exhaust lift event to promote autoignition.

The exhaust rebreathing strategy is known to be effective for thermal promotion at low load and cold conditions. However, at high load conditions, the exhaust rebreathing strategy generally penalizes engine performance by compromising engine torque delivery, high pressure rise rates, reduced fuel efficiency, and high NOx emissions due to advanced combustion. The exhaust rebreathing strategy may implement a variable valvetrain system that allows activation/deactivation of the exhaust rebreathing strategy when desirable. However, the variable valvetrain system may require a complex and costly valvetrain system. Additionally, the need for a dedicated control strategy balancing brake mean effective pressure (BMEP), total residual gas (RSG) mass, air-fuel ratio (AFR), and the turbocharger performance has been a major roadblock for exhaust rebreathing implementation in commercial heavy duty (HD) engines.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an engine. The engine includes a plurality of cylinders and a camshaft having a single cam profile. A gas intake manifold provides an air inlet to the engine and an exhaust gas rebreather system for receiving an exhaust gas from the engine. The exhaust gas rebreather system comprises a main exhaust gas outlet configured to receive the exhaust gas from the engine; an exhaust gas rebreather line configured to return at least a portion of the exhaust gas in the main exhaust gas outlet to the gas intake manifold; a variable nozzle turbocharger in fluid connection with the main exhaust gas outlet, the variable nozzle turbocharger comprising one or more variable nozzle vanes; an exhaust gas recirculation valve disposed in the exhaust gas rebreather line and in fluid connection with the main exhaust gas outlet; and a back pressure valve downstream of the variable nozzle turbocharger.

In another aspect, at least one temperature sensor is disposed proximate to an exhaust outlet.

In another aspect, when a temperature as indicated by the at least one temperature sensor is below a threshold value, the one or more variable nozzle vanes are at least partially closed.

In another aspect, the one or more variable nozzle vanes are between 50% and 90% closed.

In another aspect, when a temperature as indicated by the at least one temperature sensor is below a threshold value, the exhaust gas recirculation valve is at least partially closed.

In another aspect, the exhaust gas rebreather valve is between 60% and 100% closed.

In another aspect, when a temperature as indicated by the at least one temperature sensor is above a threshold value, the one or more variable nozzle vanes are at least partially opened.

In another aspect, when a temperature as indicated by the at least one temperature sensor is above a threshold value, the exhaust gas recirculation valve is at least partially opened. In another aspect, the exhaust gas rebreather system comprises a compressor in fluid communication with the variable nozzle turbocharger.

In another aspect, the exhaust gas rebreather system comprises an air cooler disposed downstream of the compressor.

In one aspect, embodiments disclosed herein relate to a method of operating the exhaust gas rebreather system comprising partially closing the one or more variable nozzle vanes when a temperature as indicated by at least one temperature sensor is below a threshold value, and partially closing the exhaust gas recirculation valve when the temperature is below a threshold value.

In another aspect, the threshold value is 200° C.

In another aspect, the one or more variable nozzle vanes is partially opened the one when torque demand is not met.

In another aspect, urea dosing in a selective catalytic reduction system is adjusted when a tail-pipe emissions target is not met.

In another aspect, a timing and split injection strategy is applied when a rate of rise of pressure exceeds a predetermined maximum manifold pressure rise rate.

In another aspect, the timing and split injection strategy comprises adjusting fuel injection timing.

In another aspect, the timing and split injection strategy comprises splitting a fuel injection operation into at least two injection events.

Other aspects and advantages of the claimed subject matter will be apparent from the following description and the appended claims.

DETAILED DESCRIPTION

Figure 1:
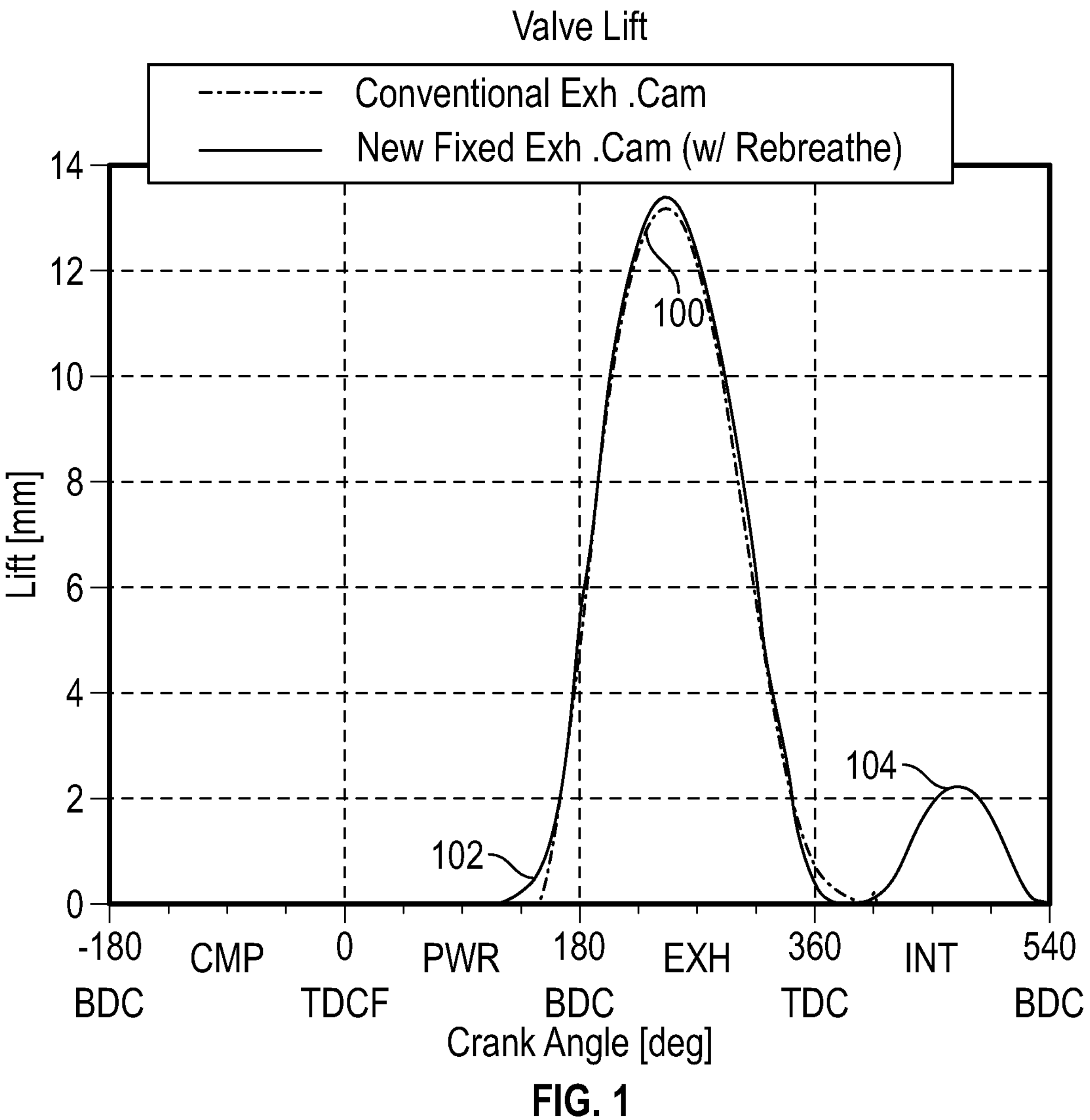
FIG. 1 illustrates profiles of a conventional exhaust lobe compared to a fixed exhaust valve cam lobe according to one or more embodiments of the present disclosure.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-8, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms “a,” “an,” and “the” include plural referents unless the context clearly dictates otherwise. Thus, for example, reference to “a passive soil gas sample system” includes reference to one or more of such systems.

Terms such as “approximately,” “substantially,” etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In one aspect, embodiments disclosed herein relate to an engine having an exhaust gas rebreather system. The exhaust gas rebreather system according to one or more embodiments of the present disclosure comprises a camshaft that generates a single cam profile and an exhaust rebreathing profile in the absence of a variable valvetrain mechanism. FIG. 1 illustrates a comparison of the cam profile (100) generated by a conventional camshaft, or cam, and a cam profile (102) and exhaust rebreathing profile (104) generated by the exhaust gas rebreather system in accordance with the invention. Each profile is a curve representing the lift of an exhaust valve in millimeters (y-axis) along the crank angle (x-axis). As shown, the cam profile (102) of the exhaust gas rebreather system follows the cam profile (100) of the conventional camshaft with the addition of the exhaust rebreathing profile (104). The exhaust rebreathing profile (104) represents a second exhaust valve lift event where hot exhaust gases are re-inducted into a cylinder of the engine. In one or more embodiments, the exhaust gas rebreather system may be used for high load operations for heavy duty engines, such as commercial class 8 HD engines. In one or more embodiments, the exhaust gas rebreather system may be used at low load operations for small-to-mid power range internal combustion engines. Generally, engine operation above 60% of its peak power level is considered “high” load. For the purposes of this disclosure, “high” load is defined as 100% power level at an 1147 engine revolutions per minute (RPM).

Figure 2:
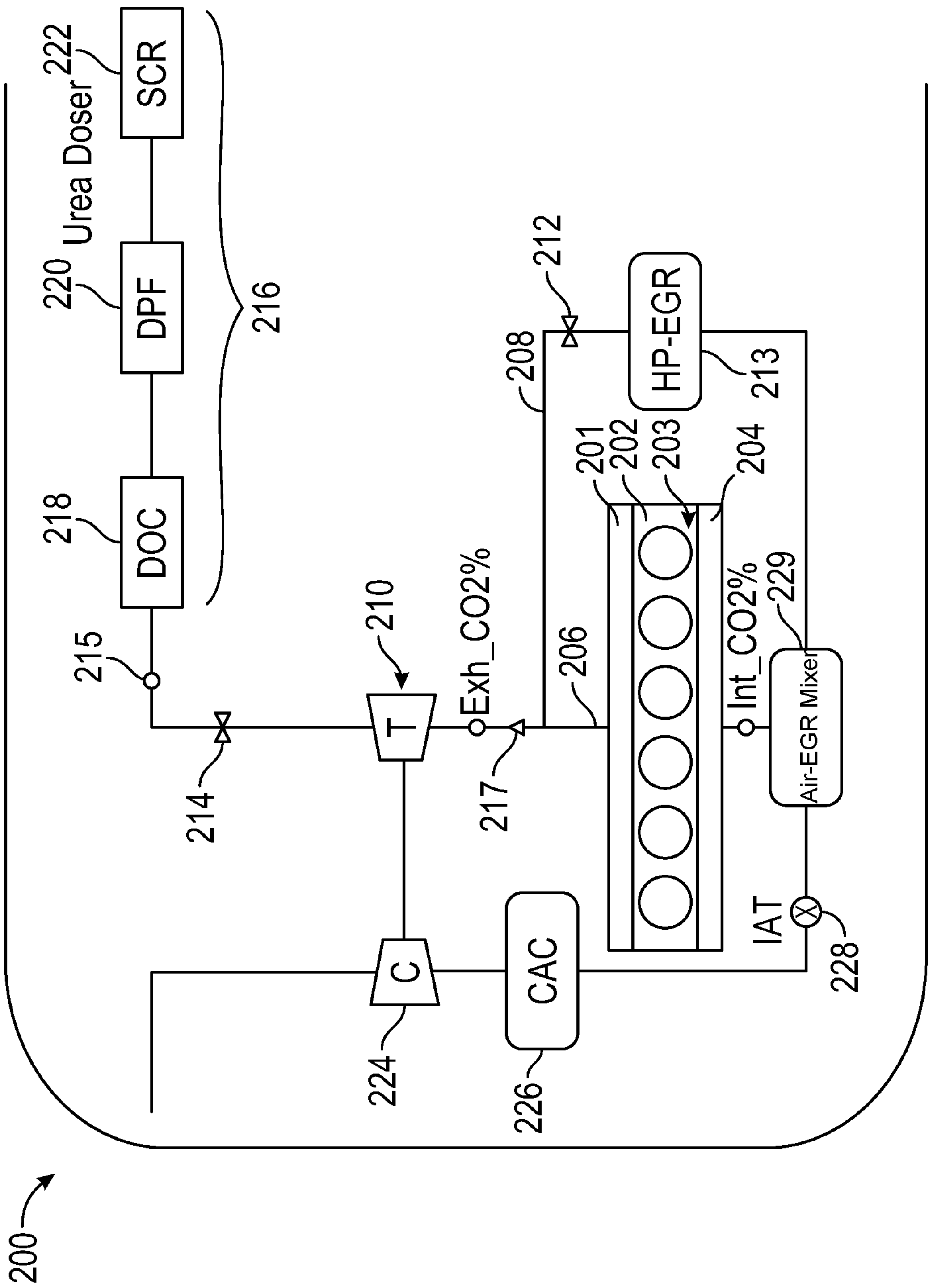
FIG. 2 is a block diagram illustrating an engine system including a fixed exhaust camshaft and a high efficiency variable nozzle turbocharger according to one or more embodiments of the present disclosure.

FIG. 2 illustrates a diagram of an exhaust gas rebreather system (200) according to one or more embodiments of the present disclosure. The exhaust gas rebreather system (200) comprises a plurality of cylinders in a cylinder bank (202) and a gas intake manifold (204) for providing an air inlet to the exhaust gas rebreather system (200). An exhaust manifold (201) collects exhaust gases from the plurality of cylinders and delivers it to the exhaust rebreather system (200). The exhaust gas rebreather system (200) is configured to collect exhaust fumes, such as nitrogen oxides (NOx), and release them from the exhaust gas rebreather system (200). The exhaust gas rebreather system (200) may include a main exhaust gas outlet (206) configured to receive the exhaust gas from the cylinder bank (202). A fixed exhaust camshaft (203) having a single cam profile may be positioned at the top of the cylinder bank (202). The fixed exhaust camshaft (203) may also be located at the head of the engine.

In one or more embodiments, the exhaust gas rebreather system (200) comprises an exhaust gas rebreather line (208) configured to return at least a portion of the exhaust gas in the main exhaust gas outlet (206) to the gas intake manifold (204). Furthermore, the exhaust gas rebreather system (200) may include a high efficiency turbocharger, such as a variable nozzle turbocharger (210), in fluid connection with the main exhaust gas outlet (206). The variable nozzle turbocharger (210), also referred to as a variable geometry turbocharger (VGT) turbine, may include one or more variable nozzle vanes inside a turbine housing between an inlet of a turbine. As exhaust gas flows through the variable nozzle turbocharger (210), the turbocharger compresses the intake air and forces more air into the engine. Compared to other turbochargers, a variable nozzle turbocharger (210) may provide a faster engine response.

An external high pressure exhaust gas recirculation (EGR) valve (212) may be disposed in the exhaust gas rebreather line (208) and in fluid connection with the main exhaust gas outlet (206). The EGR valve (212) functions to control the return of exhaust gas to the gas intake manifold (204) as part of a high-pressure EGR arrangement (213). In this context, "high" pressure refers to the relatively high pressure difference between the turbine inlet pressure and the intake manifold pressure that facilitates high exhaust gas recirculation flow, which is desirable for reduced engine-out NOx emissions. The amount of recirculated exhaust gas varies with the engine operating parameters. The EGR valve (212) may be a linear valve, poppet valve, sleeve valve, rotary valve, or any other type of valve capable of controlling the flow of fluid in the exhaust gas rebreather line (208).

The opening and closing of the EGR valve (212) may be controlled based on the exhaust temperature in the exhaust gas rebreather system (200) as measured by one or more temperature sensors (215) disposed within the exhaust gas rebreather system (200). The one or more temperature sensors (215) may be positioned proximate to one or more exhaust outlets, such as near the tail pipe, within the exhaust gas rebreather system (200). For instance, one or more temperature sensors (215) may be located proximate to a selective catalytic reduction (SCR) system, such as upstream of a diesel oxidation catalyst and/or upstream of a diesel particulate filter. As understood by one skilled in the art, the one or more temperature sensors (215) may be positioned at any location within the exhaust gas rebreather system (200) provided that an exhaust temperature may be accurately measured. The one or more temperature sensors may be one or more positive temperature coefficient (PTC) thermistors, one or more negative temperature coefficient (NTC) thermistors, or one or more of any other type of temperature sensor that provides an indication of a temperature.

A back pressure valve (214) may be located in the exhaust gas rebreather system (200) downstream of the variable nozzle turbocharger (210). The back pressure valve (214) functions to regulate the exhaust gas back pressure from the variable nozzle turbocharger (210) to the SCR system (216). The SCR system (216) allows NOx reduction reactions to occur in an oxidizing environment to reduce NOx emissions. The SCR system (216) may include a diesel oxidation catalyst (218) and a diesel particulate filter (220) upstream of a SCR inlet (222). Use of both an EGR arrangement (213) and a SCR system (216) may provide better NOx control at lower temperatures.

One or more pressure sensors (217), such as one or more differential pressure sensors, may be disposed at one or more locations within the exhaust gas rebreather system (200) to measure a change in pressure between points in the exhaust gas rebreather system (200). For instance, one or more pressure sensors (217) may be disposed upstream of the variable nozzle turbocharger (210). Additionally, one or more pressure sensors may be located upstream of the diesel particulate filter (220) at an outlet of the SCR system (216), or any exhaust outlet within the exhaust gas rebreather system (200). As understood by one skilled in the art, the one or more pressure sensors (217) may be positioned at any location within the exhaust gas rebreather system (200), provided that exhaust pressure in the exhaust gas rebreather system (200) may be accurately measured.

In one or more embodiments, the exhaust gas rebreather system (200) includes a compressor (224) in fluid communication with the variable nozzle turbocharger (210). The compressor (224) functions to increase the pressure of the air for combustion and expansion of the hot gases through the variable nozzle turbocharger (210). Additionally, a charge air cooler (226) may be disposed downstream of the compressor (224) in fluid communication with the compressor (224). The charge air cooler (226) cools the air as it leaves the compressor (224). An intake air throttle (228) may be positioned between the charge air cooler (226) and an air-EGR mixer (229). The intake air throttle (228) may regulate the amount of air delivered to an air-EGR mixer (229), which mixes air and exhaust gas upstream of the intake manifold (204). The components of the exhaust gas rebreather system (200) are in fluid connection with one another via a plurality of various lines, connections, and pipes known to one skilled in the art.

Figure 3:
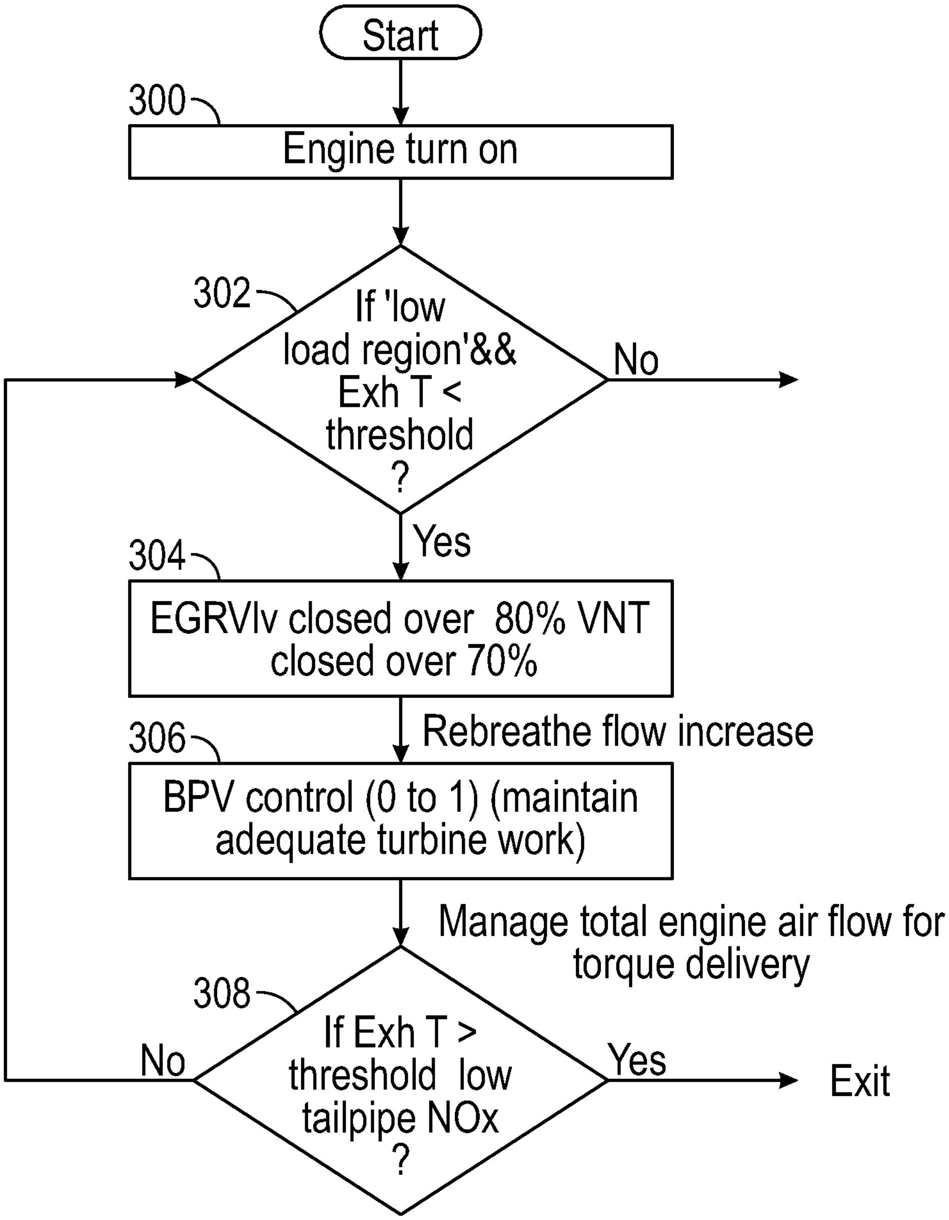
FIG. 3 is a flow diagram illustrating a control strategy for low load operation according to one or more embodiments of the present disclosure.

In one aspect, embodiments disclosed herein relate to a method of operating an exhaust gas rebreather system. FIG. 3 illustrates a control method for the exhaust gas rebreather system operating at a low load condition to maximize exhaust rebreathing flow through an exhaust valve, such as the EGR valve, during the intake stroke. In block (300), the engine system is turned on. In block (302), a determination is made regarding whether the engine system is operating at a "low load region" such that the diesel oxidation catalyst (DOC) mid-brick temperature (or DOC catalyst light-off temperature) is below a predetermined threshold, such as 200° C.

When the temperature is below the threshold, the EGR valve and the nozzle vanes of the variable nozzle turbocharger are at least partially closed in block (304). For example, the EGR valve may be between 60% and 100% closed, such as 80% closed. The nozzle vanes of the variable nozzle turbocharger may be between 50% and 90% closed, such as 70% closed. As pressure in the exhaust manifold is raised, rebreathe flow is increased. In block (306), the back pressure valve downstream of the variable nozzle turbocharger is actuated, or at least partially opened, when high turbine expansion is desired to maintain adequate total air flow through the engine for torque delivery. In one or more embodiments, the back pressure valve is maintained in an open position for a majority of the operation time. In block (308), a determination is made regarding whether the temperature of the exhaust gas exceeds the predetermined threshold (e.g., 200° C.). When the exhaust gas temperature exceeds the threshold, then the control method terminates. When the exhaust gas temperature is below the threshold, then the control method repeats until the exhaust temperature at the SCR inlet reaches a predetermined temperature threshold, such as approximately 200° C. Benefits of the low load condition may include reduced unburned hydrocarbon (UHC) and carbon monoxide (CO) emissions, increased exhaust temperature, and improved fuel efficiency.

Figure 4:
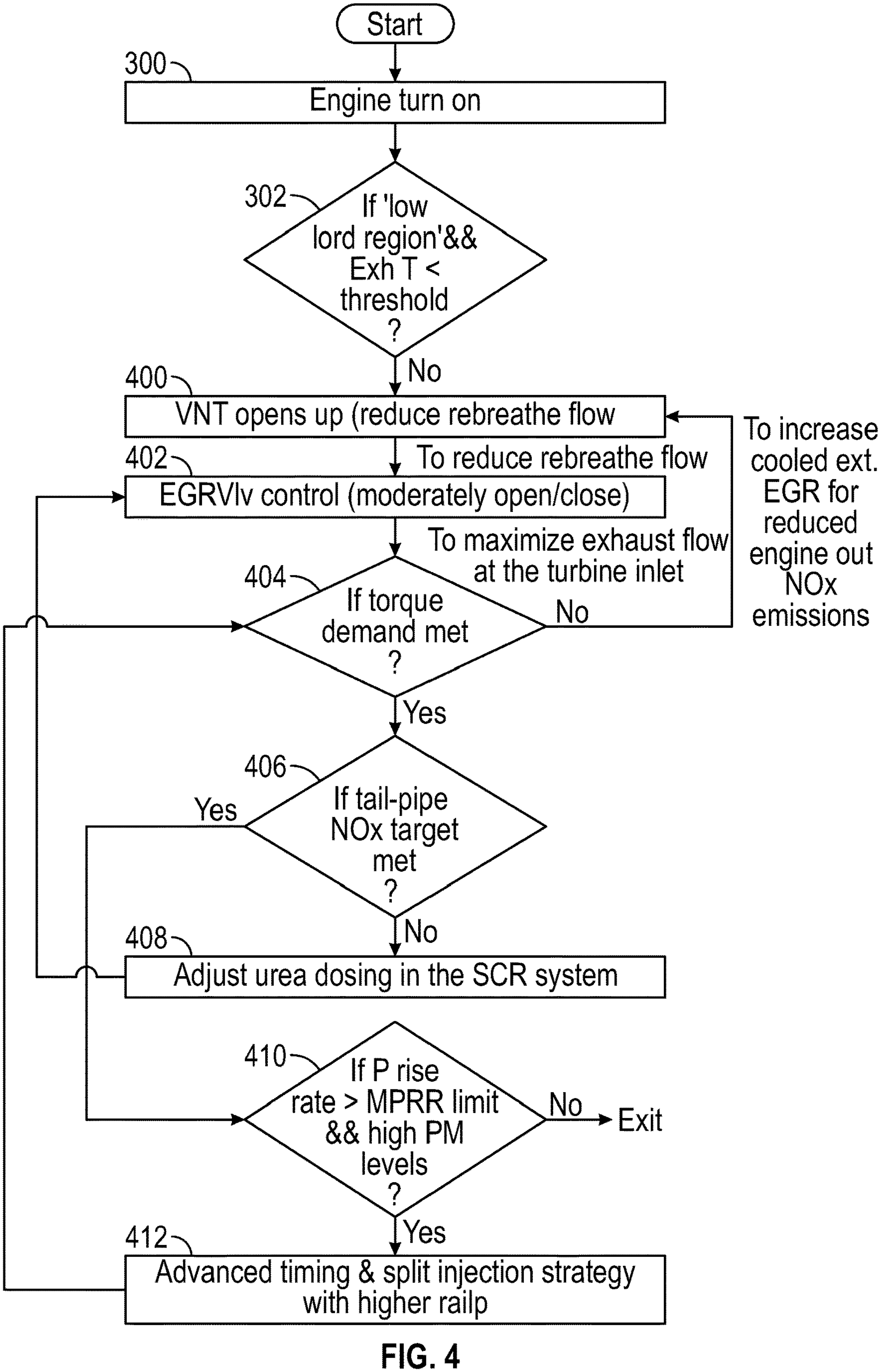
FIG. 4 is a flow diagram illustrating a control strategy for mid-to-high load operations according to one or more embodiments of the present disclosure.

FIG. 4 depicts a control method for the exhaust gas rebreather system operating at mid-to-high load conditions. In one or more embodiments, "mid-to-high" is defined as 50-100% of peak power level. Here, rebreathing flow is active through the fixed exhaust camshaft. The engine operation is adjusted to deliver uncompromised engine torque, or brake mean effective pressure, and air-fuel ratio levels similar to a conventional HD engine system. When the temperature of the exhaust gas is greater than the predetermined threshold, as determined in block (302), the nozzle vanes of the variable nozzle turbocharger are at least partially opened in block (400) to allow the exhaust gases inside the turbine housing to maximize work exchange from the hot exhaust gases to the turbine wheel, thereby generating a higher intake air pressure. Rebreathe flow is reduced. The EGR valve may remain at least partially open or at least partially closed in block (402) to maximize exhaust flow at the turbine inlet toward the turbine. Simultaneously, actuation of the nozzle vanes of the variable nozzle turbocharger in block (400), which lowers exhaust manifold pressure, reduces exhaust rebreathing flow and dilution levels. The dual effect of increased intake air pressure and reduced dilution levels increases the fresh charge air mass inside the cylinder bank, thereby improving engine torque delivery and air-fuel ratio to minimize particulate matter emissions.

In block (404), a determination is made regarding whether the torque demand is met. The determination is made based on an engine torque command by an engine control unit and the actual torque level at a dynamometer. When dyno torque equals command torque, then the torque demand is determined to be met. When not met, the nozzle vanes of the variable nozzle turbocharger are at least partially opened again in block (400). The nozzle vanes may be further opened to increase exhaust flow through the turbine and reduce rebreathe flow simultaneously. Opening the nozzle valves may improve fresh air mass in the cylinder, which is desirable to improve engine torque. When the torque demand is met, the method determines whether the tail-pipe NOx target, or limit, is met in block (406). The tail-pipe NOx target, or limit, varies, as the limit is determined by the US Environmental Protection Agency (EPA). For instance, in 2010, the limit was 0.2 g/bhp-hr, whereas for 2027, the limit is set to 0.02 g/bhp-hr (ultra-low). For the purposes of this disclosure, the target is 0.02 g/bhp-hr.

When the target is not met, urea dosing in the SCR system is adjusted in block (408), and the EGR valve is controlled in block (402). If high engine-out NOx (EO-NOx) levels are present, the SCR system, using urea/$NH_3$ dosing, catalytically reduces NOx into $N_2$ and water. Depending on the EO-NOx levels, urea dosing is adjusted to meet the tail-pipe NOx limit. In addition, when the target is not met, the EGR valve may be opened more to reduce the EO-NOx. Furthermore, urea dosing may be increased simultaneously to meet the tail-pipe NOx target. Both blocks (402) and (408) work in tandem to meet the tail-pipe NOx limit.

Due to reduced dilution levels, engine-out NOx emissions levels are expected to rise; however, urea dosing is adequately managed to treat the NOx in the SCR system (being warmed-up) to achieve the tail-pipe NOx emissions target. When the NOx target is met, the method determines whether the rate of rise in pressure exceeds a predetermined maximum manifold (air) pressure rise rate (MPRR) in block (410). The MPRR limit is defined to regulate the noise level during combustion. A very high MPRR may cause an uncomfortable noise level from combustion during engine operation. The MPRR limit of 12 bar per crank angle degree (CAD) may be used, similar to existing HD diesel engines. When the rate of rise in pressure exceeds the MPRR, then an advanced timing and split injection strategy is applied with a higher railP in block (412). Benefits of the mid-to-high load condition may include prevention of MPRR limit breach and adequate fuel-air mixing with high railP and early fuel injection. When block (410) leads to high MPRR and high particulate matter (PM) emissions, fuel injection timing is advanced early during the compression stroke and the fuel injection pressure (RailP) to enhance air-fuel mixing and reduce PM emissions during combustion. However, advancing of fuel injection timing may also lead to high MPRR. Therefore, total fuel injection is split into multiple (at least two) injection events to slow down the pressure rise rate. The purpose of block (412) is to adjust the fuel injection timing (i.e., split fuel injection operation events and fuel injection pressure) simultaneously to achieve the MPRR limit and low PM emissions.

Concept engine testing was conducted over a wide range of operating conditions, including both low and high load ranges. Tables 1 and 2 show example engine specifications and mechanical constraints, respectively, for an engine system according to one or more embodiments of the present disclosure.

TABLE 1

| Engine Specifications | |
|---|---|
| Displacement | 14.9 L |
| # of Cylinders | 6 |
| Bore | 137 mm |
| Stroke | 169 mm |
| Fuel System | 2500 bar common rail |
| Air System | 1-Stage VG Turbocharger HPEGR & CAC |
| Engine Ratings | 336 kW (450 hp) @ 1800 rpm |

TABLE 2

| Mechanical Constraints | | |
|---|---|---|
| Peak Firing Pressure | [bar] | 200 |
| Max. Press. Rise Rate | [bar/CAD] | 12 |
| Turbine-In Temp | [° C.] | 760 |
| Turbine Speed | [kRPM] | 200 |

Engine performance was evaluated at 1145 rpm/2.7 bar BMEP (A15) and 1600 rpm/17 bar BMEP (C100). A15 represents a low load engine operation during the Federal Test Procedure (FTP) and low load transient test cycles. In contrast, C100 represents high power engine conditions, where exhaust rebreathing may compromise the cylinder's volumetric efficiency in absence of the control method described herein.

Figure 5A:
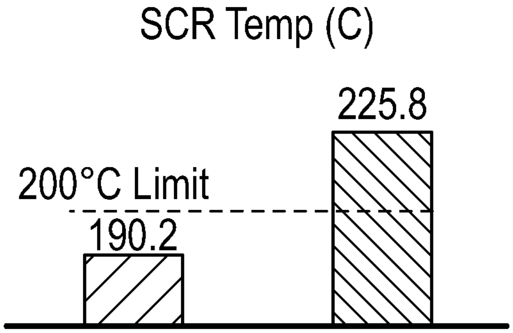
FIGS. 5A-5F illustrate engine performance comparisons between conventional engine systems and the engine system according to one or more embodiments of the present disclosure.
Figure 5B:
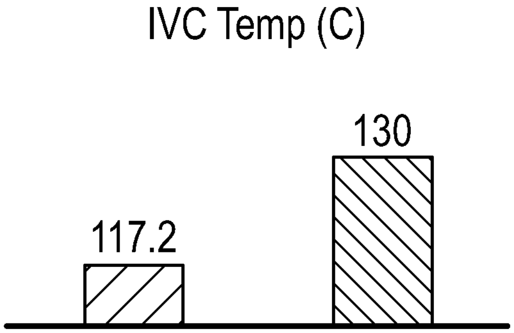
Figure 5C:
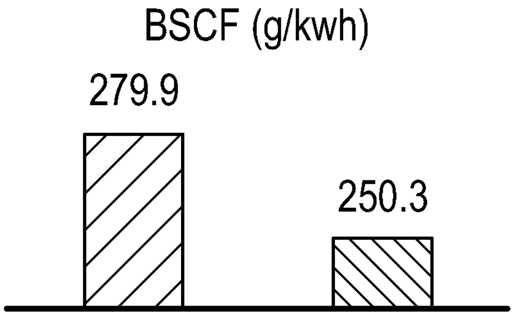
Figure 5D:
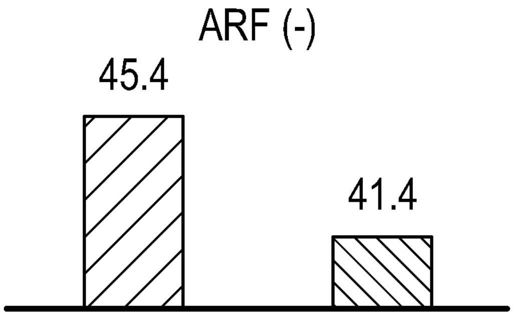
Figure 5E:
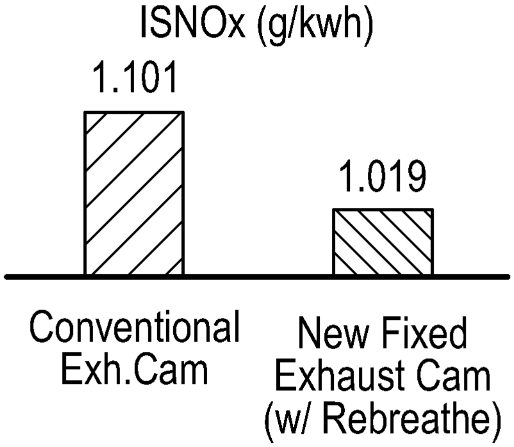
Figure 5F:
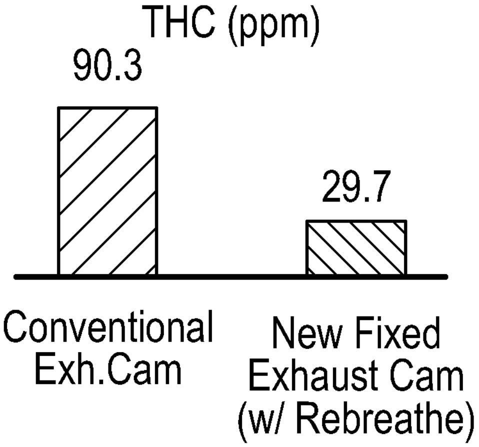

FIGS. 5A-5F illustrate engine performance comparisons between a conventional engine system and the engine system described herein using the low load control. FIG. 5A illustrates a comparison in SCR temperatures as a measure of SCR warm-up. The engine system according to one or more embodiments of the present disclosure achieved an exhaust gas temperature at the SCR inlet (SCR Temp) of well over the 200° C. threshold. The conventional engine system failed to achieve the minimum desired SCR temperature level. FIG. 5B illustrates a comparison in intake valve closing (IVC) temperatures as a measure of in-cylinder charge thermal promotion. FIG. 5C depicts a comparison in brake-specific fuel consumption (BSFC) as a measure of fuel efficiency. FIG. 5D depicts a comparison of air fuel ratios. FIG. 5E illustrates a comparison of indicated specific NOx (ISNOx). FIG. 5E illustrates a comparison of total hydrocarbon emissions. The engine system described herein demonstrated a significant reduction in NOx emissions (FIG. 5E), total THC emissions (FIG. 5F), and over 10% lower fuel consumption (FIG. 5C) compared to the conventional engine system. The reduced fuel consumption was partially attributed to the improved gas exchange process.

Figure 6:
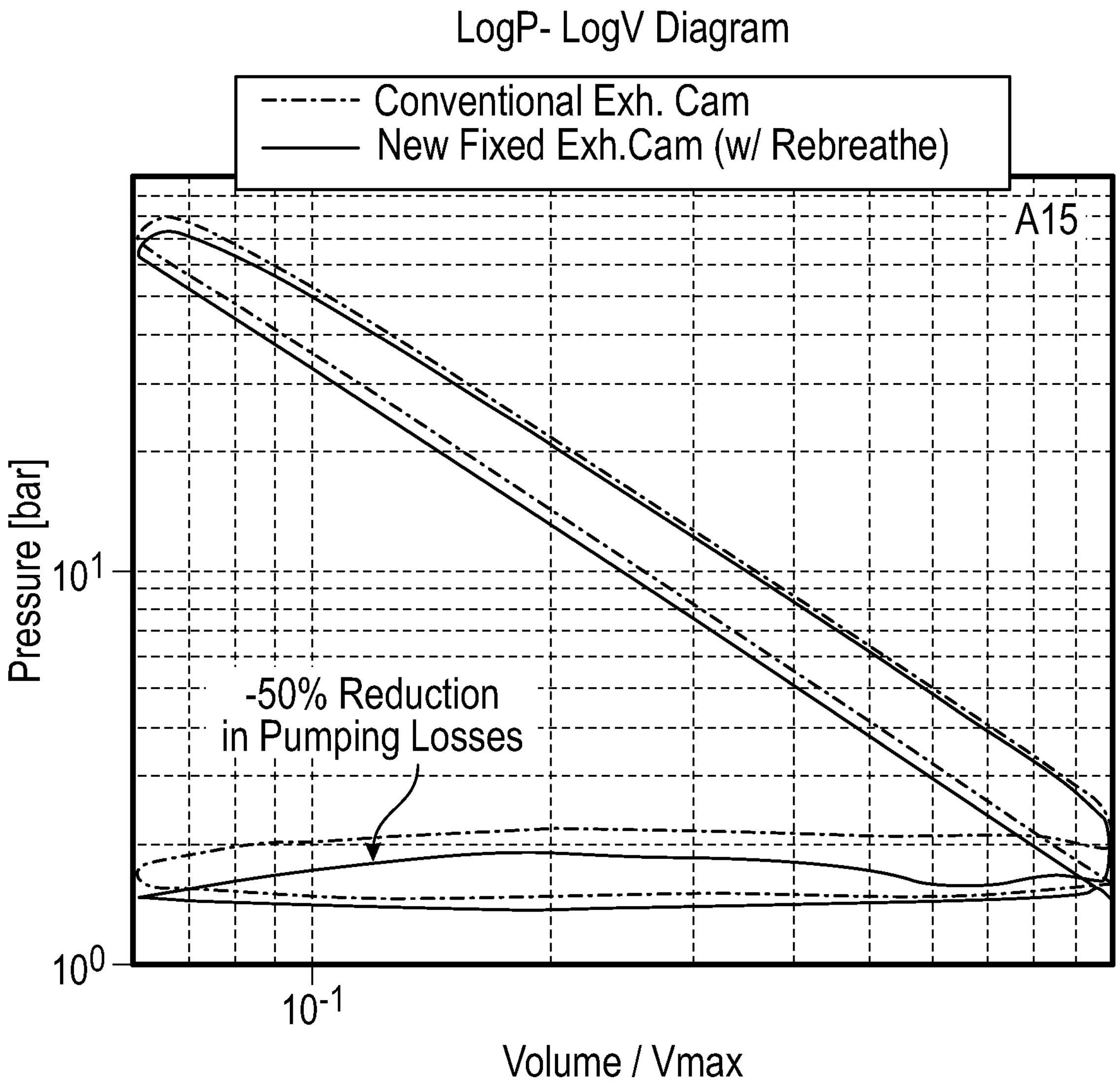
FIG. 6 illustrates a comparison between a conventional exhaust camshaft and a fixed exhaust camshaft according to one or more embodiments of the present disclosure.

FIG. 6 depicts a comparison of log P-Log V (pressure and volume) traces between the engine system described herein and conventional engine systems. As shown, the exhaust rebreathing profile of the engine system with fixed exhaust camshaft lobe helped alleviate exhaust pressure, leading to a nearly 50% reduction in the pumping losses.

Figure 7A:
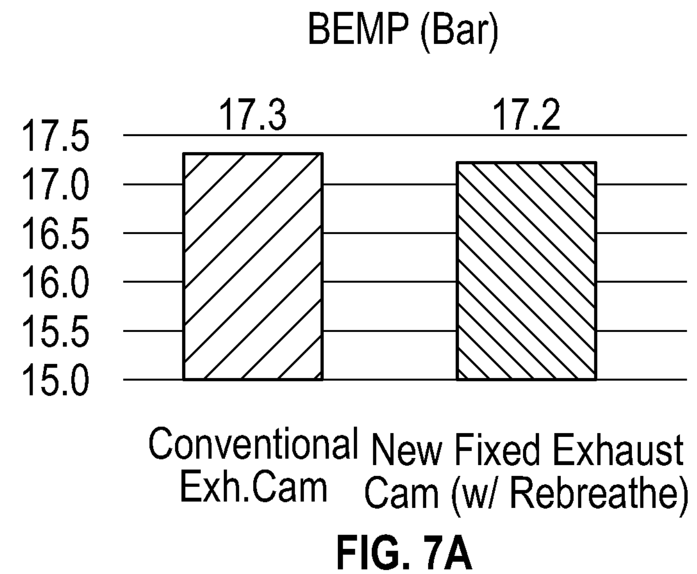
FIGS. 7A-7F illustrate engine performance comparisons between conventional engine systems and the engine system according to one or more embodiments of the present disclosure.
Figure 7B:
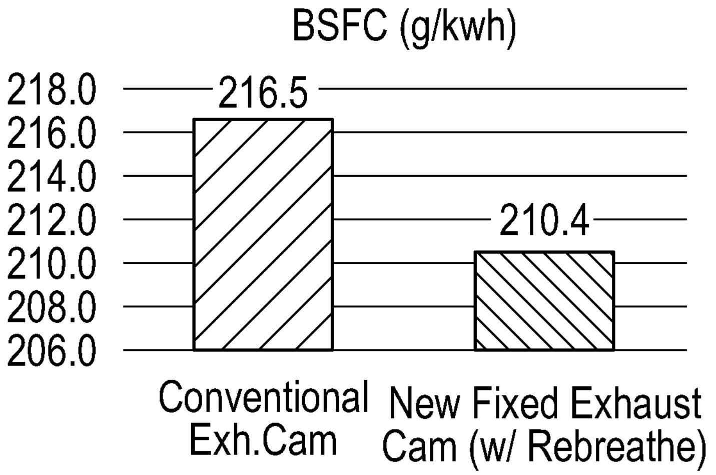
Figure 7C:
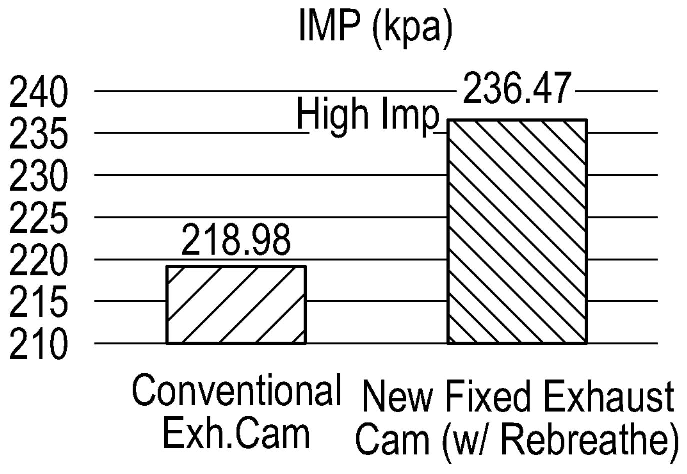
Figure 7D:
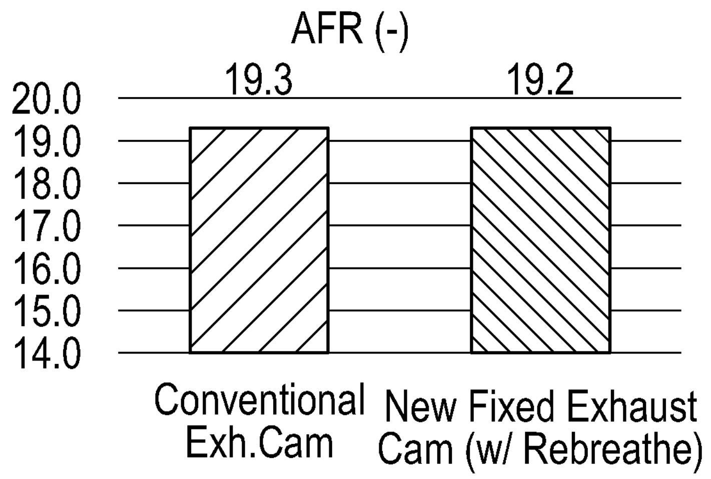
Figure 7E:
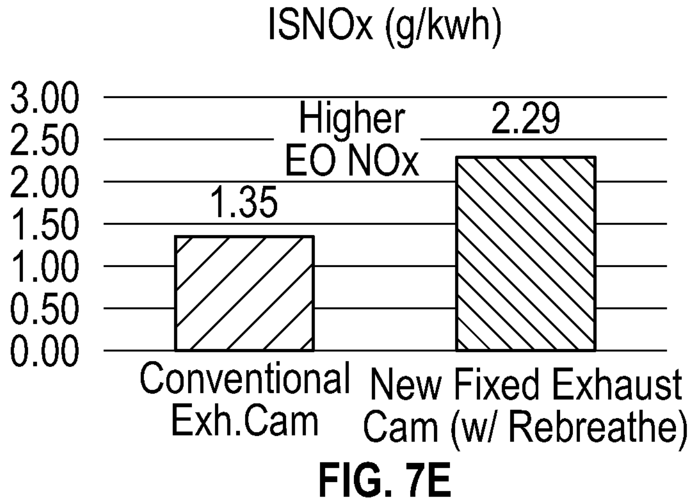
Figure 7F:
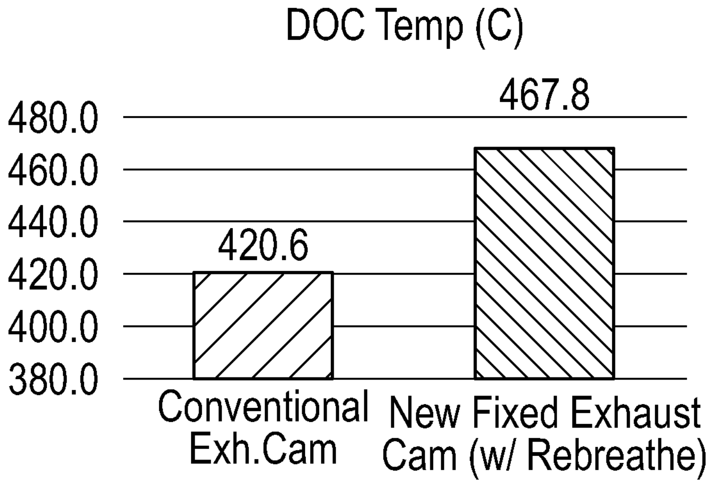
Figure 8:
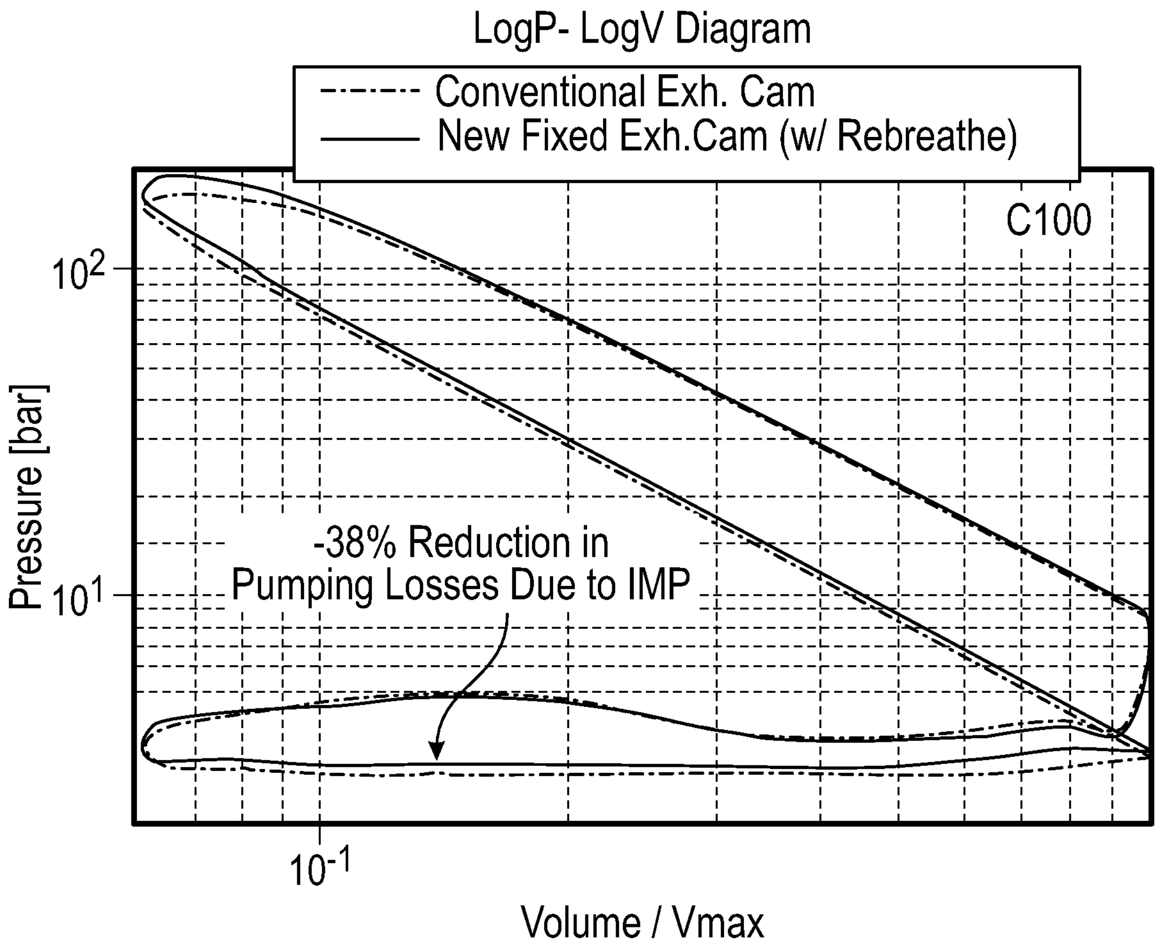
FIG. 8 illustrates a Log P-Log V trace comparison between a conventional exhaust camshaft and a fixed exhaust camshaft according to one or more embodiments of the present disclosure.

FIGS. 7A-7F show engine performance comparisons between an engine having a conventional exhaust camshaft lobe and an engine having the fixed exhaust camshaft lobe. Implementing the medium-to-high load control method according to one or more embodiments of the present disclosure, higher intake air pressure (IMP) was managed that increased the in-cylinder charge air mass adequately, leading to an uncompromised engine torque level (FIG. 7A) and air-fuel ratio (FIG. 7D) compared to the conventional engine system. As expected, due to reduced exhaust rebreathing, engine-out NOx emission was noted higher in the engine system described herein (FIG. 7E). Nevertheless, higher engine out NOx was reduced down to acceptable tailpipe NOx levels by controlling urea dosing in the SCR system. Interestingly, the engine system according to one or more embodiments of the present disclosure also showed overall reduced fuel consumption compared to the conventional engine system, as shown in FIG. 7B. This was partly attributed to the improved pumping losses due to increased intake pressure levels for the engine system, as evidenced from the Log P-Log V traces comparison in FIG. 8.

Embodiments of the present disclosure may provide at least one of the following advantages. Use of the engine system having the fixed exhaust camshaft lobe may reduce the complexity and cost associated with a variable valvetrain system for exhaust rebreathing control. The control methods described permit achievement of the objectives of maximized exhaust rebreathing benefits at low loads and maintaining engine torque levels with improved fuel efficiency and an acceptable engine-out NOx emission at high loads. The control methods may achieve viability of exhaust rebreathing implementation in commercial HD engines without additional costs or complexity. The control methods may stay 'ON' all the time, thereby eliminating the complexity and cost associated with a variable valvetrain system. At low loads, the control methods cost-effectively enable in-cylinder and exhaust gas temperature increases. At high loads, the integrated exhaust rebreathing and air handling system efficiently delivers the air and EGR flow targets with adequate charge cooling.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed:

1. An exhaust gas rebreather system, comprising:

a main exhaust gas outlet configured to receive an exhaust gas from an engine, the engine having a plurality of cylinders, a camshaft having a single cam profile in the absence of a variable valvetrain mechanism, and a gas intake manifold for providing an air inlet to the engine;

an exhaust gas rebreather line configured to return at least a portion of the exhaust gas in the main exhaust gas outlet to the gas intake manifold;

a variable nozzle turbocharger in fluid connection with the main exhaust gas outlet, the variable nozzle turbocharger comprising one or more variable nozzle vanes;

an exhaust gas recirculation valve disposed in the exhaust gas rebreather line and in fluid connection with the main exhaust gas outlet;

a back pressure valve downstream of the variable nozzle turbocharger; and at least one temperature sensor disposed proximate to the main exhaust gas outlet, wherein the one or more variable nozzle vanes is configured to at least partially close in response to a temperature threshold indicated by the at least one temperature sensor.

2. The exhaust gas rebreather system of claim 1, wherein the one or more variable nozzle vanes is configured to close between 50% and 90%.

3. The exhaust gas rebreather system of claim 1, wherein the temperature threshold is 200° C.

4. The exhaust gas rebreather system of claim 1, wherein the exhaust gas recirculation valve is configured to at least partially close in response to a temperature threshold indicated by the at least one temperature sensor.

5. The exhaust gas rebreather system of claim 4, wherein the exhaust gas recirculation valve is configured to close between 60% and 100%.

6. The exhaust gas rebreather system of claim 1, wherein the one or more variable nozzle vanes is configured to at least partially open in response to a temperature threshold indicated by the at least one temperature sensor.

7. The exhaust gas rebreather system of claim 1, wherein the exhaust recirculation valve is configured to at least partially open in response to a temperature threshold indicated by the at least one temperature sensor.

8. The exhaust gas rebreather system of claim 1, comprising a compressor in fluid communication with the variable nozzle turbocharger.

9. The exhaust gas rebreather system of claim 8, comprising an air cooler disposed downstream of the compressor.

10. A method of operating an exhaust gas rebreather system, the exhaust gas rebreather system comprising:

a main exhaust gas outlet configured to receive an exhaust gas from an engine having a plurality of cylinders, a camshaft having a single cam profile in the absence of a variable valvetrain mechanism, and a gas intake manifold for providing an air inlet to the engine;

an exhaust gas rebreather line configured to return at least a portion of the exhaust gas in the main exhaust gas outlet to the gas intake manifold;

a variable nozzle turbocharger in fluid connection with the main exhaust gas outlet, the variable nozzle turbocharger comprising one or more variable nozzle vanes;

an exhaust gas recirculation valve disposed in the exhaust gas rebreather line and in fluid connection with the main exhaust gas outlet; and a back pressure valve downstream of the variable nozzle turbocharger, wherein the method comprises:

partially closing the one or more variable nozzle vanes in response to a temperature, as indicated by at least one temperature sensor, being below a threshold value; and partially closing the exhaust gas recirculation valve in response to the temperature being below the threshold value.

11. The method of claim 10, wherein the threshold value is 200° C.

12. The method of claim 10, further comprising partially opening the one or more variable nozzle vanes in response to a temperature, as indicated by the at least one temperature sensor, being above the threshold value.

13. The method of claim 10, further comprising partially opening the exhaust gas recirculation valve in response to a temperature, as indicated by the at least one temperature sensor, being above the threshold value.

14. The method of claim 10, further comprising partially opening the one or more variable nozzle vanes in response to torque demand not being met.

15. The method of claim 10, wherein the exhaust gas rebreather system further comprises a selective catalytic reduction system, the method further comprising adjusting urea dosing in the selective catalytic reduction system in response to a tail-pipe emissions target not being met.

16. The method of claim 10, further comprising applying a timing and split injection strategy in response to a rate of rise of pressure exceeding a predetermined maximum manifold pressure rise rate.

17. The method of claim 16, wherein the timing and split injection strategy comprises adjusting fuel injection timing.

18. The method of claim 16, wherein the timing and split injection strategy comprises splitting a fuel injection operation into at least two injection events.

19. A method of operating an exhaust gas rebreather system, the exhaust gas rebreather system comprising:

a main exhaust gas outlet configured to receive an exhaust gas from an engine having a plurality of cylinders, a camshaft having a single cam profile, and a gas intake manifold for providing an air inlet to the engine;

an exhaust gas rebreather line configured to return at least a portion of the exhaust gas in the main exhaust gas outlet to the gas intake manifold;

a variable nozzle turbocharger in fluid connection with the main exhaust gas outlet, the variable nozzle turbocharger comprising one or more variable nozzle vanes;

an exhaust gas recirculation valve disposed in the exhaust gas rebreather line and in fluid connection with the main exhaust gas outlet; and a back pressure valve downstream of the variable nozzle turbocharger, wherein the method comprises:

partially closing the one or more variable nozzle vanes in response to a temperature, as indicated by at least one temperature sensor, being below a threshold value;

partially closing the exhaust gas recirculation valve in response to the temperature being below the threshold value; and applying a timing and split injection strategy in response to a rate of rise of pressure exceeding a predetermined maximum manifold pressure rise rate.

* * * * *